July 11, 1967 HANS-JOACHIM JANSSEN ETAL 3,330,515
MACHINE INSTALLATION
Filed Nov. 2, 1964 3 Sheets-Sheet 1
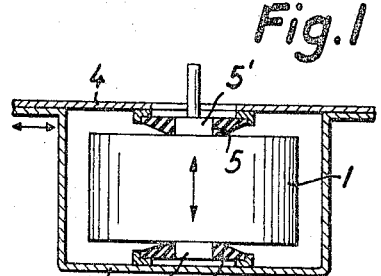
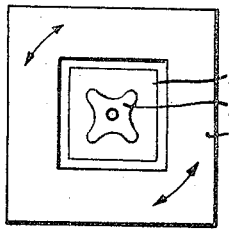
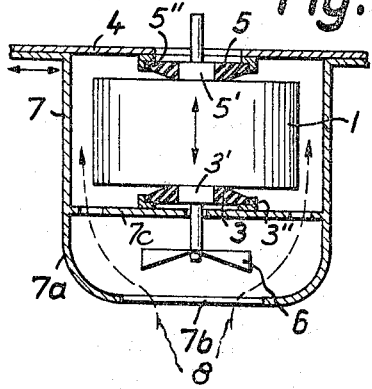
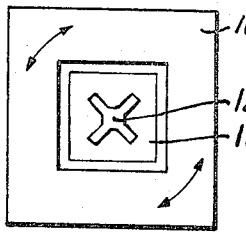
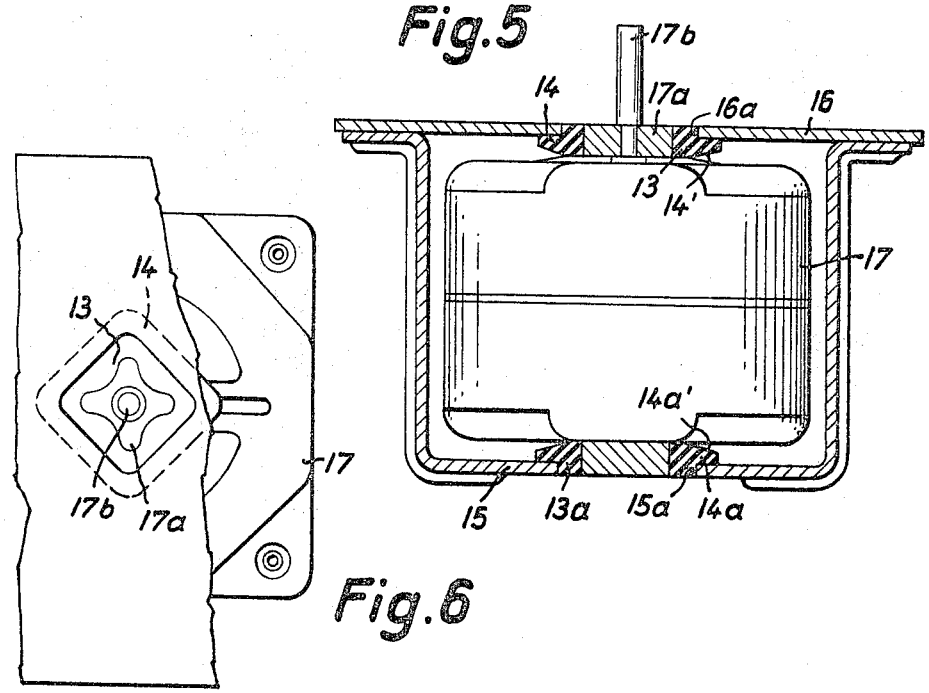
Inventors:
Hans-Joachim Janssen
Hans Schumann & Uwe Lunau
by: George H Spencer
      attorney

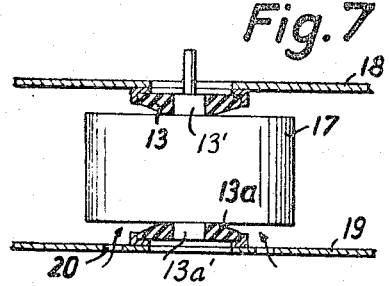
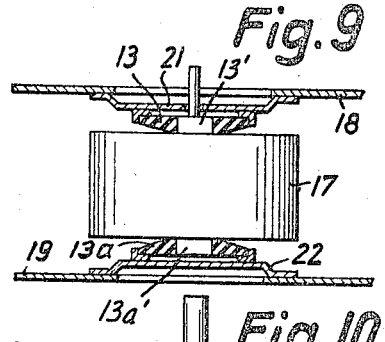
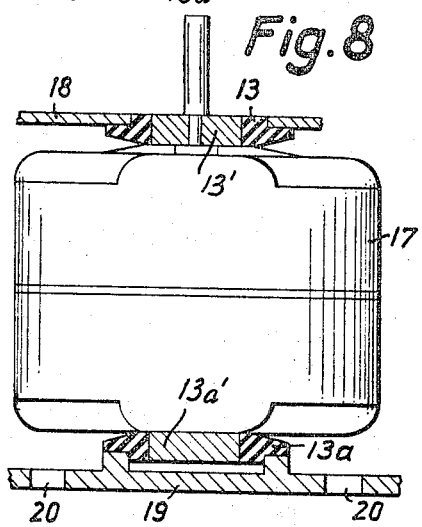
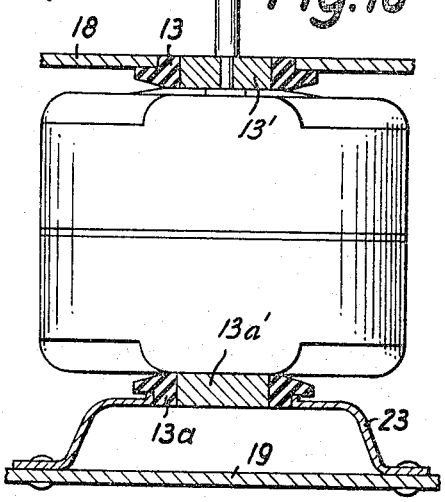
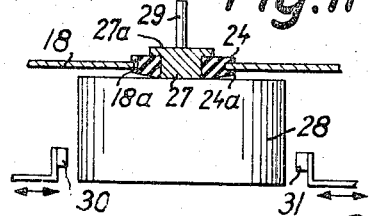
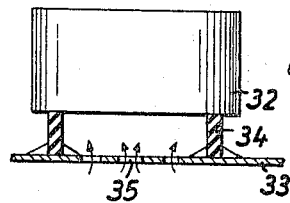
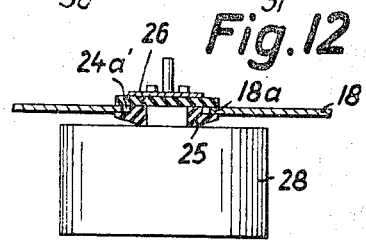
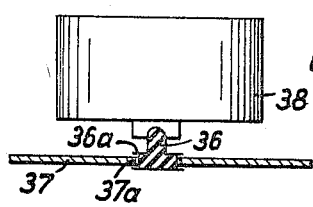

July 11, 1967  HANS-JOACHIM JANSSEN ETAL  3,330,515
MACHINE INSTALLATION
Filed Nov. 2, 1964  3 Sheets-Sheet 3

Inventors:
HANS-JOACHIM JANSSEN
HANS SCHUMANN
UWE LUNAU
By Spencer & Kaye
ATTORNEYS

United States Patent Office 3,330,515
Patented July 11, 1967

3,330,515
MACHINE INSTALLATION
Hans-Joachim Janssen, Eichenalle, Hundsmuhlen in Oldenburg, Hans Schumann, Oldenburg in Oldenburg, and Uwe Lunau, Hannover, Germany, assignors to Licentia Patent-Verwaltungs-G.m.b.H., Frankfurt am Main, Germany
Filed Nov. 2, 1964, Ser. No. 408,721
Claims priority, application Germany, May 2, 1960, L 36,055
17 Claims. (Cl. 248—26)

The present invention relates to the installation of electric machines, and this application is a continuation-in-part application of co-pending application Ser. No. 106,944, filed May 1, 1961, now abandoned.

More particularly, the present invention relates to the installation of motors, particularly the installation of small electric motors in sound recording and reproducing apparatus, wherein a high degree of vibration insulation or shock absorption is obtained.

In order to prevent the vibrations of a motor from being transmitted, the solids through which sound is transmitted must be tuned overcritically. Sufficient vibration insulation is achieved when the ratio of resonant frequency to the frequency to be insulated is ⅓ or smaller. Thus, if the frequency of the power supply is the standard 60 c.p.s., the fundamental frequency to be insulated will be 120 c.p.s.; there will also be harmonics of 240 c.p.s. and 360 c.p.s. The resonant frequency should, therefore, not exceed approximately 30 c.p.s. In order to obtain such a low resonant frequency in small motors, a low torsion spring constant must be sought. On the other hand, the spring can not be too soft because of the axial forces applied at the output shaft. Inasmuch as it is desired to insulate primarily against pendular oscillations, use is made of the torsion spring constant transformation principle, and the spring element is brought as close as possible to the pendulum or rotational oscillation axis. In this way, a so-called center point coupling is obtained.

As an improvement of the above, there exists a vibratory yoke-type support in which the motor is mounted with its axis oriented horizontally. Here the shape of the spring and insulating elements remains of importance insofar as the low torsion constant is concerned, it being this shape rather than the hardness of the spring which is the deciding factor.

According to the present invention, the vibratory insulating installation of the motor is improved and even better insulation against vibration is obtained by installing the motor, by means of a center point coupling, with the shaft of the motor being oriented vertically. The spring and other structural elements of the center point coupling are modified accordingly because, instead of being placed only under radial load as was heretofore the case, these parts are now placed under axial load as well. Thus, in addition to being loaded in a plane normal to the axis, the parts are now also stressed in axial direction, but as a result, axial vibrations may readily be isolated.

More particularly, the present invention resides mainly in an arrangement for isolating the vibration of a vertically oriented motor mounted in a housing, which arrangement comprises a polygonal frame arranged on the housing, a flat elastic motor mount and coupling element having a peripheral edge portion which is loosely inserted in the frame and has an outer contour mating with the inner contour of the frame. The term "loosely" employed herein is to be construed in its normal sense to indicate that the coupling element has relative freedom of movement, or is free from a state of confinement or restraint, with respect to the frame in which it is inserted. No critical dimensional requirements are placed on the coupling element, it only being necessary that the edges of the coupling element be sufficiently long to prevent the coupling element from falling through the frame. The coupling has, at its center, a cut-out, which, in a preferred embodiment of the present invention, is generally cruciform. The motor has at least one hub which has an outer cross-sectional configuration which mates with i.e., is similar to, the inner cross-sectional configuration of the cut-out of the coupling element. The hub is received in this cut-out of the coupling element, thereby to establish a connection which is radially elastic and which affords axial yielding. Either only the surface portion of the coupling element yields in axial direction, or the element is membrane-like so that, due to the membrane-like configuration, the axial yielding is afforded by the axial movement of the center of the coupling element with respect to the peripheral edge portion thereof.

The heretofore used yoke carrying the two coupling elements for the motor is thus replaced by a simpler yoke which carries but one of the coupling elements, the other coupling element being arranged on the support plate or housing plate of the apparatus with which the motor is associated. In some cases, it may be advantageous to replace the yoke by a cup-shaped member or by a cooling jacket, or by a member which serves both functions.

Since the axis of the machine is vertical, the two coupling elements may be referred to as the upper and lower coupling element, respectively. Depending on the dimensions of the motor and on the distance between the support plate and the bottom plate of the apparatus, the yoke may be dispensed with entirely, the lower coupling element then being attached to the bottom plate. Assuming the upper end of the motor to be the work output end, and assuming that the axial forces which will be encountered will not be too high, it may even be possible to omit the lower coupling element entirely or to replace it by a simple elastic support. The motor will then be installed in a suspended position. If, in such an installation, it is expected that the motor shaft will be subjected to shocks when it is placed under load, pendular movement of the suspended motor can easily be avoided by means of an elastic brace, such as a tubular member or a nipple, interposed between the bottom face of the motor and the bottom plate of the apparatus. If a tubular member is used, suitable vent openings may open into the interior thereof. Alternatively, abutment means may be provided for damping these pendular movements, which abutment means may be coupled with the means for placing the motor under load.

It has been found desirable to make the coupling element of a generally cruciform cross-sectional configuration, thereby obtaining a low torsion constant.

Additional objects and advantages of the present invention will become apparent upon consideration of the following description when taken in conjunction with the accompanying drawings in which:

FIGURE 1 is a diagrammatic, sectional, elevational view of a motor installation according to the present invention.

FIGURE 2 is a diagrammatic, sectional elevational view of a modified embodiment of the present invention.

FIGURE 3 shows one embodiment of a coupling element according to the present invention.

FIGURE 4 shows another embodiment of a coupling element according to the present invention.

FIGURE 5 is a sectional elevational view of another embodiment of the present invention.

FIGURE 6 is a top plan view of the structure shown in FIGURE 5, with the parts being shown partly broken away.

FIGURE 7 is a diagrammatic, sectional, elevational view of yet another embodiment of the present invention.

FIGURE 8 is a sectional elevational view of a modification of the embodiment of FIGURE 7.

FIGURE 9 is a diagrammatic, sectional, elevational view of a still further embodiment of the present invention.

FIGURE 10 is a sectional elevational view of an embodiment similar to that depicted in FIGURE 9.

FIGURE 11 is a diagrammatic, sectional, elevational view of yet another embodiment of the present invention showing a suspended motor installation.

FIGURE 12 is a diagrammatic, sectional, elevational view of an embodiment similar to that depicted in FIGURE 11.

FIGURE 13 is a diagrammatic, sectional, elevational view of yet another embodiment of the present invention showing a suspended motor installation, together with means for preventing pendular movements of the motor.

FIGURE 14 is a diagrammatic, sectional, elevational view of a modification of the embodiment depicted in FIGURE 13.

Figure 15:
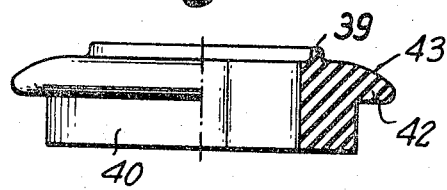
FIGURE 15 is an elevational view, partly in section of a coupling element with an annular ridge.

Referring now to the drawings, FIGURE 1 is a schematic representation showing the installation of an electrical machine, such as a small motor 1, in a piece of sound reproducing apparatus, as, for example, a tape recorder. The motor is illustrated as having an internal rotor, although the invention is equally applicable to motors having external rotors. The motor is oriented such that its axis extends in vertical direction, and is mounted by means of a two-legged yoke 2 which carries a lower coupling or mounting element 3. The legs of the yoke 2 are secured to an upper cover plate 4 which carries an upper coupling element 5, this cover plate being part of a housing to which the motor 1 is secured. The remainder of the housing is not shown in the drawings. Inasmuch as the lower coupling element 3 supports the weight of the motor, the installation can be referred to as a standing one. Accordingly, the lower coupling element 3 can be different from the upper one and be specially designed so as to enable it properly to support the weight of the motor 1 has upper and lower hubs 5′, 3′, which are received in cut-outs of the elements 5, 3, respectively, the outer cross-sectional configuration of each hub being similar to the inner cross-sectional configuration of the corresponding coupling element.

In accordance with the present invention, the coupling element 3 is a generally flat, membrane-like element, which provides a connection that is not only radially elastic, but which also allows a "bending through," in axial direction, i.e., due to the membrane-like configuration of the coupling element, there will be an axial yielding upon axial movement of the center of the coupling element with respect to the peripheral edge portion thereof which itself is loosely inserted in the frame of the machine in which the motor is installed, this peripheral edge portion of the coupling element having, as stated above an outer contour which is similar to the inner contour of the frame.

In place of the two-legged yoke, a single-leg yoke can be provided. Alternatively, the yoke can be replaced by a cup-shaped member within which the motor is arranged. This member may be made of electrically insulating material for shielding the motor, and may be perforated so as to allow the motor to be ventilated. A particularly advantageous arrangement is shown in FIGURE 2 in which the lower end of the motor shaft is extended and carries ventilating vanes 6, the cup-shaped member 7 being provided with a hood portion 7a having a central opening 7b so as to produce the effect of a radial ventilator which causes air to move past or through the motor 1. FIGURE 2 shows frames 3″ and 5″ which receive the elements 3 and 5, respectively, frame 5″ being secured to the cover plate 4 and frame 3″ being secured to a transverse wall 7c of member 7.

FIGURES 3 and 4 show the characteristic configurations of the coupling elements for damping torsional oscillations. According to FIGURE 3, the coupling hub 9 of the motor stator 10 is of generally cruciform cross section, the cross-sectional configuration being generally square, with rounded corners and inwardly arched sides, so as to impart to the hub a configuration composed of four short and wide arms. The coupling element 11, which is made of rubber or other elastomeric material, has an interior cross-sectional configuration corresponding to the external cross-sectional configuration of the hub 9 and an external cross-sectional configuration which is square and has diagonals coinciding with, i.e., extending in the same direction as, the diagonals of the hub.

The arrangement shown in FIGURE 4 differs from that of FIGURE 3 in that the external cross-sectional configuration of the coupling hub 12 of stator 10a and the internal cross-sectional configuration of the coupling element 11a are more markedly cruciform.

FIGURES 5 and 6 show the constructional features of the motor installation, which includes elastic upper and lower coupling elements 13, 13a, having flange portions 14, 14a, respectively. The flange portion 14a overlies the edge of a cut-out 15a in the yoke 15, whereas the flange portion 14 underlies the edge of a cut-out 16a in a cover plate 16. Thus, the motor 17 is elastically mounted for movement in axial direction between the bottom of the yoke 15 and the cover plate 16. Axial vibrations are isolated by making the coupling elements of appropriate axial thickness and/or by selecting appropriate curvatures for the annular calotte-shaped surfaces 14′, 14a′, of the flange portions against which the motor abuts. Torsional vibrations are isolated by the above-described configuration of the coupling elements surrounding the coupling hubs 17a. The motor shaft is shown at 17b.

FIGURES 7 and 8 are diagrammatic and structural representation, respectively, of another so-called standing installation of the motor 17. Here the two coupling elements 13, 13a, are interposed between a cover plate 18 and a bottom plate 19 of a given piece of equipment, the hubs of the motor 17 being shown at 13′ and 13a′. The bottom plate is provided with ventilating openings 20 which encircle the coupling element 13a and allow the motor to be cooled.

The embodiment shown schematically in FIGURE 9 differs from the previously described one in that springs such as arched leaf springs 21, 22, are interposed between each of the mounting plates 18, 19, and the corresponding coupling elements 13, 13a, thereby increasing the damping of axial vibrations. Such an arrangement is particularly desirable in installations where difficult to manage oscillations appear, as well as for heavy motors.

The arrangement shown structurally in FIGURE 10 is similar to that of FIGURE 9, except that there is but one arched leaf spring 23 interposed between the motor 17 and the bottom plate 19. It will be appreciated that the dimensions of this spring 23 may be such as to compensate for differences between the axial length of the motor and the distance between the plates 18 and 19.

FIGURES 11 through 14 are schematic illustrations showing suspended rather than standing installations of the motor in that the lower coupling element is omitted for purposes of simplicity and economy. Thus, FIGURE 11 shows a coupling element 24 constituted by a single integral elastomeric entity and provided with an annular groove 24a which receives the edge portion of the cut-out 18a of the plate 18. The cross-sectional configuration of the coupling element 24 and of the coupling hub 27 of the motor 28 are as shown in either of FIGURES 3 or 4. The hub is additionally formed with a retaining flange 27a overlying the coupling element 24.

It will be noted that this type of installation of the motor allows the same to carry out pendular movements, so in order to prevent the motor shaft 29 from being subjected to shocks when a load is coupled to the motor, abutment means, such as abutments 30 and 31, are provided against which the motor 28 may abut, thereby limiting any pendular movements. These abutments may be coupled with the means that couple the motor to a load.

The embodiment of FIGURE 11 is best suited for relatively light loads; if heavier loads are encountered, it is expedient to replace the integral coupling element by a two-piece element comprising a profiled member 25 and a disc-shaped member 26, as shown in FIGURE 12. These two members together form between themselves the annular groove 24' in which the edge portion of the cut-out 18a of plate 18 is received.

FIGURE 13 shows another way in which pendular movements of the suspended motor may be isolated. Thus, an elastic hollow cylinder member 34, such as a piece of rubber tubing arranged coaxially with the motor 32, is interposed between the lower end of the motor and the bottom plate 33. Ventilating openings 35 are provided which open interiorly of the member 34.

FIGURE 14 shows yet another way for damping the pendular movements of the suspended motor 38. This is accomplished by a rubber or otherwise elastic nipple 36 in the form of a button attached to the lower end of the machine and formed with an annular groove 36a which receives the edge portion of a cut-out 37a of the bottom plate 37.

Figure 15A:
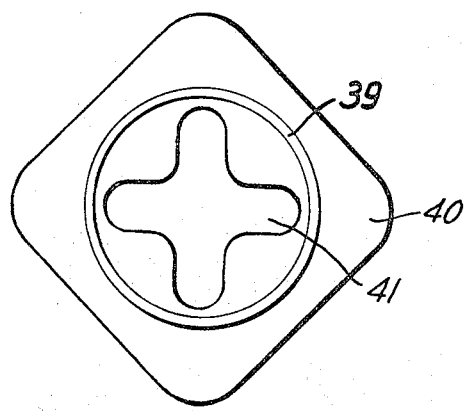
FIGURE 15a is a plan view of the coupling element shown in FIGURE 15.

FIGURES 15 and 15a show a coupling element 40 with an annular ridge having an upper surface 39 which surrounds the cruciform cut-out 41. The element 40 has a radially projecting flange 42 whose upper annular surface 43 is calotte-shaped.

The following are illustrative examples of the present invention.

EXAMPLE I

The motor being mounted was one in accordance with FIGURES 1, 7 and 9, the coupling element being as shown in FIGURE 3. The motor weighed 18.44 ounces. The coupling element was one made of rubber having a hardness of 50 shore, the axial thickness of the element being 5.5 mm. The outer contour of the coupling elements was a square 240 x 240 mm., and had a flange of 20 mm. wide. The element had a cruciform cut-out, the distance between the ends of the arms being 140 mm. and the arms being 35 mm. wide. The distance between the inwardly arched sides of the cruciform was 80 mm.

Despite the relatively great weight of the motor vibrating at 120 c.p.s., the 50 shore was found to result in a so-called shock course of the coupling element of but 0.3 mm., i.e., the coupling was found to bend through at its axis 0.3 mm. with respect to the peripheral edge portion. In this way, the vibration of the motor was found to be effectively isolated from the frame.

The damping factor was found to be 0.15.

EXAMPLE II

A motor as shown in FIGURES 3, 5 and 8 and weighing 30 ounces was mounted by means of a coupling element according to FIGURE 3. The coupling element was made of 50 shore rubber, was 8.5 mm. thick, had an outer square contour 280 x 280 mm. and a flange of 50 mm. The distances between the ends of the arms was 190 mm., the arms were 50 mm. wide, and the distance between the inwardly arched sides of the cruciform cross section was 100 mm.

The coupling element had a flange portion with an annular surface, the transverse section being of calotte-shaped configuration. A central portion of the surface bent under the weight of the motor, producing a shock course of 0.3 mm. Only a small portion of the surface was deformed, rather than there having been a complete membrane-like deformation.

It will be understood that the above description of the present invention is susceptible to various modifications, changes, and adaptations, and the same are intended to be comprehended within the meaning and range of equivalents of the appended claims. For example, the electrical motor installed according to the present invention may function as a generator.

What is claimed is:

1. In combination with at least one motor hub oriented to have a vertical axis, a vibration isolating mounting comprising:
   (a) a stationary polygonal frame; and
   (b) a flat, elastic motor support and coupling element having a peripheral edge portion which is loosely inserted in said frame, said coupling element having an outer contour complementary to the inner contour of said frame and having, at its center, a cut-out whose inner cross-sectional configuration is complementary to the outer cross-sectional configuration of said hub, said hub being received in said cut-out for producing a connection which is radially and torsionally elastic and which affords axial yielding of the inner portion of said coupling element.

2. A mounting as defined in claim 1 wherein said outer contour of said coupling element and the inner contour of said frame are square.

3. A mounting as defined in claim 2 wherein said cut-out is cruciform, the arms of said cruciform cut-out of said coupling element extending in the same directions as the diagonals of said square.

4. A mounting as defined in claim 1 wherein said coupling element is provided with a flange portion abutting against said frame.

5. A mounting as defined in claim 4 wherein said flange portion has an annular surface.

6. A mounting as defined in claim 1 further comprising a yoke supporting said frame, and a cover plate which cover plate carries said yoke, wherein there are provided two centrally arranged motor hubs, and wherein two coupling elements are provided one of which abuts against said yoke and cooperates with one of said hubs and the other of which coupling elements abuts against said cover plate and cooperates with the other of said hubs.

7. A mounting as defined in claim 1 further comprising a cup-shaped member supporting said frame, and a cover plate which plate carries said member, wherein there are provided two centrally arranged motor hubs, and wherein two coupling elements are provided one of which abuts against the bottom of said cup-shaped member and cooperates with one of said hubs and the other of which coupling elements abuts against said cover plate and cooperates with the other of said hubs.

8. A mounting as defined in claim 7 wherein said cup-shaped member is made of electrically insulating material.

9. A mounting as defined in claim 7 wherein said cup-shaped member is provided with motor ventilating perforations.

10. A mounting as defined in claim 1 further comprising spaced bottom and top plates, said frame being supported by said bottom plate wherein two centrally arranged hubs are provided, and wherein two coupling elements are provided one of which abuts against said bottom plate and cooperates with one of said hubs and the other of which coupling elements abuts against said top plate and cooperates with the other of said hubs.

11. A mounting as defined in claim 10 wherein said bottom plate is provided with ventilating perforations encircling the corresponding coupling element.

12. A mounting as defined in claim 1, wherein said frame is part of a sound reproducing apparatus.

13. A mounting as defined in claim 1 wherein said coupling element is membrane-like and wherein, due to the membrane-like configuration of said coupling element, the axial yielding is afforded by the axial movement of the center of said coupling element with respect to the peripheral edge portion thereof.

14. A mounting as defined in claim 1 wherein only a portion adjacent that surface of said coupling element which contacts said hub yields in the axial direction.

15. A mounting as defined in claim 1 wherein said coupling element has a hardness of about 50 Shore.

16. A mounting as defined in claim 1 wherein said coupling element has a hardness which, for a given motor, gives said coupling element a maximum shock course of about 0.3 mm. when subjected only to forces resulting from the weight and normal rotation of such motor.

17. In combination with a vertically-oriented motor provided with at least one hub, a vibration isolating mounting for said motor, comprising:
    (a) a stationary polygonal frame; and
    (b) a flat, elastic motor support and coupling element having a peripheral edge portion which is loosely inserted in said frame, said coupling element having an outer contour complementary to the inner contour of said frame and having, at its center a cut-out whose inner cross-sectional configuration is complementary to the outer cross-sectional configuration of said hub, said hub being received in said cut-out for producing a connection which is radially and torsionally elastic and which affords axial yielding of the inner portion of said coupling element.

References Cited
UNITED STATES PATENTS

| | | | |
|---|---|---|---|
| 1,684,144 | 9/1928 | Rettig | 248—17 |
| 1,971,417 | 8/1934 | Kingston et al. | 248—26 |
| 2,020,092 | 11/1935 | Allen | 248—26 |
| 2,042,666 | 6/1936 | Kunkle | 248—26 |
| 2,251,398 | 8/1941 | Clark | 248—26 |
| 2,301,818 | 11/1942 | Sackett | 248—26 |
| 2,349,215 | 5/1944 | Wahlborg | 248—26 |
| 2,485,848 | 10/1949 | Sharp | 318—34 |
| 2,508,641 | 5/1950 | Heintz | 248—26 |
| 2,620,151 | 12/1952 | Peters | 248—26 |
| 2,838,262 | 6/1958 | Anderson | 248—26 |
| 2,857,189 | 10/1958 | Jeffrey | 287—85 |
| 2,928,632 | 3/1960 | Morrill | 248—26 |

FOREIGN PATENTS

| | | |
|---|---|---|
| 652,525 | 11/1937 | Germany. |
| 719,452 | 4/1942 | Germany. |

JOHN PETO, *Primary Examiner.*

CLAUDE A. LE ROY, *Examiner.*